United States Patent
Ghia et al.

(10) Patent No.: US 6,963,219 B1
(45) Date of Patent: Nov. 8, 2005

(54) PROGRAMMABLE DIFFERENTIAL INTERNAL TERMINATION FOR A LOW VOLTAGE DIFFERENTIAL SIGNAL INPUT OR OUTPUT BUFFER

(75) Inventors: Atul V. Ghia, San Jose, CA (US); Ketan Sodha, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 96 days.

(21) Appl. No.: 10/409,891

(22) Filed: Apr. 8, 2003

(51) Int. Cl.[7] ............................................. H03K 17/16
(52) U.S. Cl. .......................... 326/30; 326/86; 327/321
(58) Field of Search ...................... 326/30, 86; 327/321, 327/328

(56) References Cited

U.S. PATENT DOCUMENTS

| | | | |
|---|---|---|---|
| 5,635,859 A * | 6/1997 | Yokota et al. ................. | 326/67 |
| 5,958,026 A * | 9/1999 | Goetting et al. ............... | 710/52 |
| 5,977,796 A * | 11/1999 | Gabara ......................... | 326/86 |
| 6,744,779 B1 * | 6/2004 | Yamaguchi et al. ........ | 370/449 |
| 6,765,829 B2 * | 7/2004 | Graf et al. ............. | 365/189.07 |

* cited by examiner

Primary Examiner—Daniel D. Chang
(74) Attorney, Agent, or Firm—E. Eric Hoffman; LeRoy D. Maunu; Lois D. Cartier

(57) ABSTRACT

A configurable low voltage differential signal (LVDS) system is located on a chip, such as a programmable logic device. The configurable LVDS system includes a pair of I/O pads, an LVDS transmitter for driving a differential output signal onto the I/O pads, an LVDS receiver for receiving a differential input signal from the I/O pads, and a termination resistor coupled across the pair of I/O pads, wherein the termination resistance can be enabled for use with either the LVDS transmitter or the LVDS receiver. Control circuitry is provided to control the selective enabling and disabling of the LVDS transmitter, the LVDS receiver and the termination resistance. This control circuitry can be configured in response to configuration data values stored on the chip.

17 Claims, 15 Drawing Sheets

PROGRAMMABLE DIFFERENTIAL INTERNAL TERMINATION FOR A LOW VOLTAGE DIFFERENTIAL SIGNAL INPUT OR OUTPUT BUFFER

FIELD OF THE INVENTION

The present invention relates to a low voltage differential signal (LVDS) input/output circuit for an integrated circuit. More specifically, the present invention relates to an LVDS input/output circuit having an LVDS input buffer that can use a resistance associated with a corresponding LVDS output buffer as an internal termination resistance.

BACKGROUND

Programmable logic devices (PLDs), such as field programmable gate arrays (FPGAs), typically include input/output blocks (IOBs) for providing and receiving external data. The IOBs of some PLDs can be configured to implement a low voltage differential signal (LVDS) scheme using an LVDS input buffer and an LVDS output buffer.

FIG. 1 is a block diagram of a conventional IOB 100 that includes both an LVDS output buffer 101 and an LVDS input buffer 102. After the PLD has been configured, either LVDS output buffer 101 or LVDS input buffer 102 can be enabled such that the enabled buffer is effectively coupled to differential communication channel 140.

Parasitic resistances 121–124 are located in the path between IOB 100 and communications channel 140. The chip boundary of the associated PLD is illustrated by dashed line 150. Thus, parasitic resistances 121–122 are on-chip resistances that exist between the output terminals of output driver 101, the input terminal of input driver 102 and the chip boundary. These on-chip parasitic resistances 121–122 are largely represented by the conductive elements required to couple IOB 100 to the pad of the chip, and the conductive elements (e.g., bonding wires or solder balls) required to couple the pin of the chip to a contact element on the external structure of the package. Parasitic resistances 123–124 are off-chip resistances that exist between pins of the chip and termination resistor 130. Parasitic resistances 123–124 typically represent traces on a printed circuit board. Although termination resistor 130 is typically located as close as possible to the pins of the receiving chip, the parasitic resistances 123–124 will always exist.

LVDS output buffer 101 includes an LVDS transmitter 110, which provides a differential output signal to communications channel 140 in response to an output data value DOUT. An internal termination resistance 111 is provided within the LVDS transmitter 110. The internal termination resistance 111 is designed to provide for proper signal termination at the transmit end of communication channel 140. Thus, when IOB 100 is configured as an LVDS transmitter, the internal termination resistance 111 provides proper signal termination at the transmit side of communication channel 140, without requiring a termination resistor external to the PLD.

LVDS input buffer 102 includes an LVDS receiver 120, which provides an input data value DIN in response to a differential input signal received on communications channel 140. LVDS receiver 120 does not include an internal termination resistance. As a result, an external termination resistance 130 must be provided across the lines of differential communications channel 140 when IOB 100 is configured as an LVDS receiver. This external termination resistance 130 is selected to provide the proper signal termination at the receive side of communication channel 140. Parasitic resistances 121–124 are located between termination resistor 130 and the input terminals of LVDS receiver 120. These parasitic resistances can cause signal degradation, causing LVDS receiver 120 to provide erroneous input data values DIN.

It would therefore be desirable to have an improved IOB, which allows an LVDS receiver to be terminated in a manner that substantially eliminates the parasitic resistances between the input terminals of the LVDS receiver and the termination resistance. It would further be desirable to have an improved IOB, which provides an internal termination resistance for an LVDS receiver. It would further be desirable for such an improved IOB to be implemented in a manner consistent with present IOBs.

SUMMARY

Accordingly, the present invention provides a configurable low voltage differential signal (LVDS) system for a programmable logic device. The configurable LVDS system includes a pair of I/O pads, an LVDS transmitter for driving a differential output signal onto the I/O pads, an LVDS receiver for receiving a differential input signal from the I/O pads, and an internal termination resistor coupled across the pair of I/O pads. The internal termination resistor can be enabled for use with either the LVDS transmitter or the LVDS receiver. Because the internal termination resistor is located relatively close to input terminals of the LVDS receiver, the parasitic resistances that exist between the internal termination resistor and the associated communication channel are negligible, and do not have a significant adverse effect on the LVDS receiver.

Control circuitry is provided to control the selective enabling and disabling of the LVDS transmitter, the LVDS receiver and the termination resistance. This control circuitry can be configured in response to configuration data values stored in configuration memory cells of the programmable logic device. For example, a first set of configuration data values can be used to enable and disable the LVDS transmitter, a second set of configuration data values can be used to enable and disable the internal termination resistor, and a third set of configuration data values can be used to enable and disable the LVDS receiver.

In accordance with one embodiment, the programmable logic device can include additional receiver elements, such as a differential amplifier, Schmitt trigger or high-speed transceiver logic (HSTL) receiver. In this embodiment, the control circuit may disable the LVDS receiver, LVDS transmitter and internal termination resistor, and enable one of these additional receiver elements. This embodiment provides additional flexibility to the configurable LVDS system.

In accordance with one embodiment, the internal termination resistor can include one or more transistors connected between the I/O pads. These transistors are turned on to enable the internal termination resistor, and turned off to disable the internal termination resistor. Moreover, the internal termination resistor can be implemented in a plurality of stages.

The present invention will be more fully understood in view of the following descriptions and drawings.

DETAILED DESCRIPTION

Figure 2:
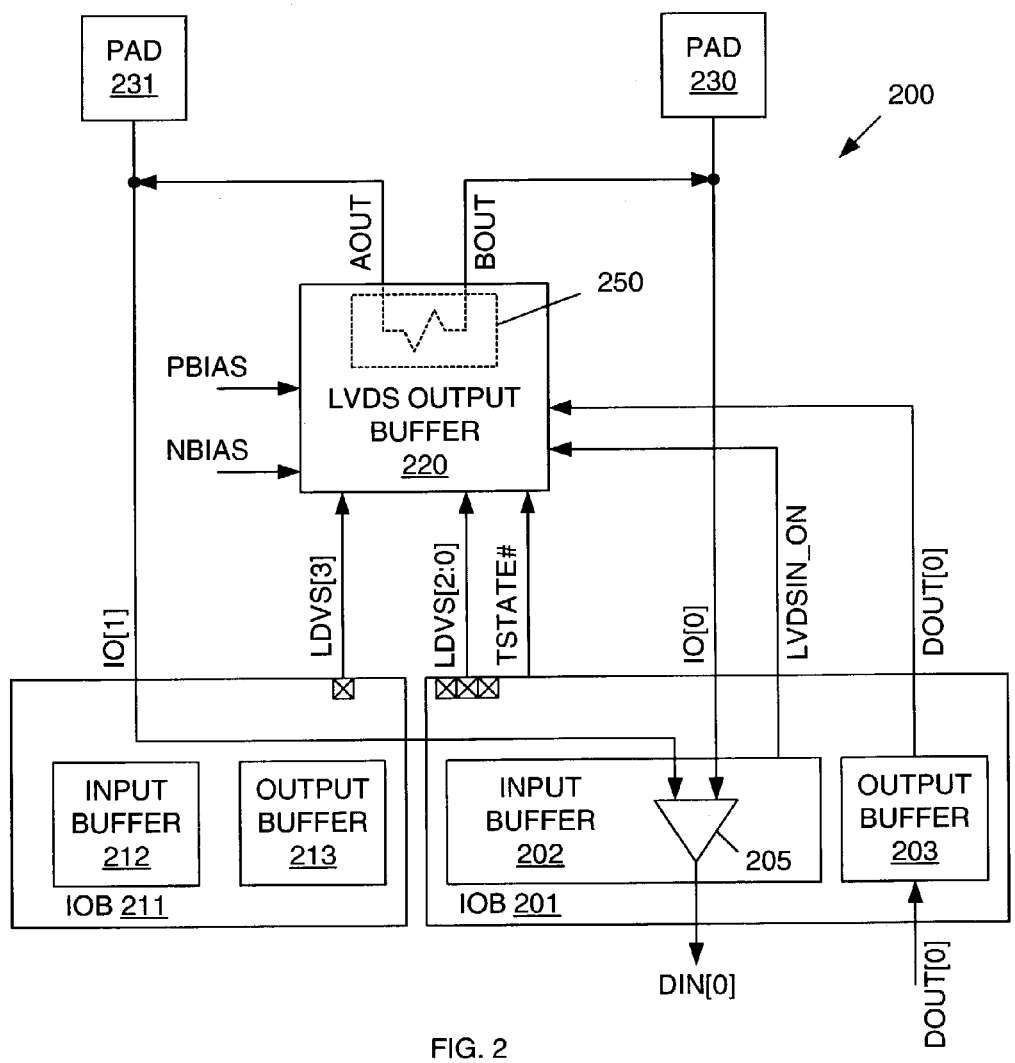
FIG. 2 is a block diagram of a configurable LVDS system in accordance with one embodiment of the present invention.

FIG. 2 is a block diagram of a configurable LVDS system 200 in accordance with one embodiment of the present invention. Configurable LVDS system 200 is located on a programmable logic device (PLD), such as a field programmable gate array (FPGA). In one embodiment, configurable LVDS system 200 is implemented using a Virtex-II™ FPGA available from Xilinx, Inc., 2100 Logic Drive, San Jose, Calif. 95124. Configurable LVDS system 200 includes IOBs 201 and 211, LVDS output buffer 220, and input/output (I/O) pads 230–231. IOB 201 includes input buffer 202 and output buffer 203. Input buffer 202 includes LVDS receiver 205. IOB 211, which is identical to IOB 201, includes input buffer 212 and output buffer 213 (neither of which is used in the present embodiment).

IOBs 201 and 211 each have a corresponding I/O pad 230 and 231, respectively. However, the two IOBs 201 and 211 share a single LVDS output buffer 220. As described in more detail below, configurable LVDS system 200 can be configured as follows.

Figure 1:
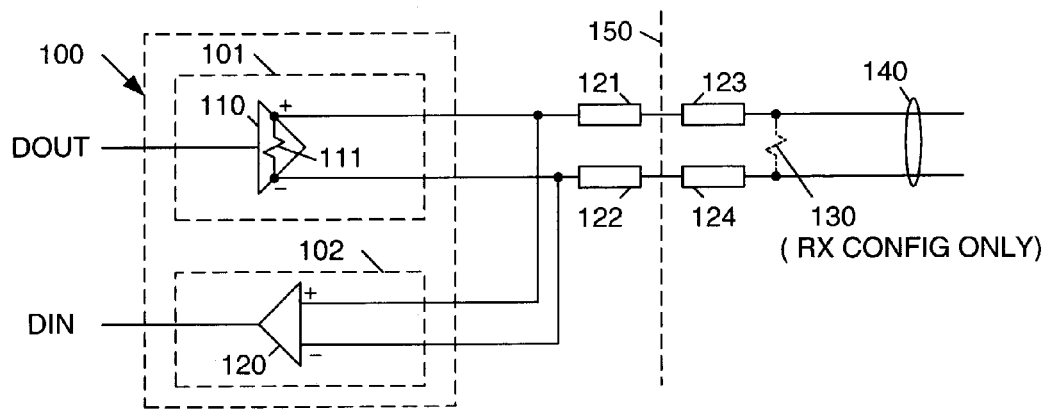
FIG. 1 is a block diagram of a conventional LVDS IOB, and an associated communication channel.

First, configurable LVDS system 200 can be configured as a conventional LVDS output buffer. In this configuration, an output data value DOUT[0] is provided from the PLD to output buffer 203. Output buffer 203 routes this output data value DOUT[0] to LVDS output buffer 220. LVDS output buffer 220 is configured to operate as a conventional LVDS transmitter in response to various configuration data values, including but not limited to, the configuration data values LVDS[3:0], TSTATE# and LVDSIN_ON provided by IOBs 201 and 211. The tri-state enable signal TSTATE# can be a configuration data value or a user controlled signal. The LVDS transmitter in LVDS output buffer 220 drives a differential output signal on differential output terminals AOUT and BOUT, to pads 230–231 in response to the output data value DOUT[0]. This LVDS transmitter includes an internal termination resistance 250, which is similar to the internal termination resistance 111 described above in connection with FIG. 1.

In accordance with one embodiment of the present invention, configurable LVDS system 200 can also be configured as an LVDS receiver. In this configuration, a differential input data value, represented by the differential signals IO[0] and IO[1], is provided from an external differential communications channel to I/O pads 230 and 231, respectively. This differential input signal IO[1:0] is routed to the input terminals of LVDS receiver 205 of input buffer 202. Note that IOB 211 is configured to route the input signal IO[1] from I/O pad 231 to IOB 201. IOB 201 is configured to route the input signal IO[0] from I/O pad 230 to IOB 201. LVDS receiver 205 is configured to operate as a conventional LVDS receiver in response to various configuration data values, which are described in more detail below. In response to the input signal IO[1:0], LVDS receiver 205 drives an input signal DIN[0] to the PLD.

When configurable LVDS system 200 is configured as an LVDS receiver, LVDS output buffer 220 is configured to couple the internal termination resistance 250 across pads 230 and 231, in the manner illustrated in FIG. 2. As a result, an internal termination resistance is connected across the input terminals of LVDS receiver 205. This internal termination resistance 250 is located closer to LVDS receiver 205 than the parasitic resistances of configurable LVDS system 200 (see, e.g., parasitic resistances 121–124, FIG. 1). Because internal termination resistance 250 is located so close to the input terminals of LVDS receiver 205, improved signal integrity is exhibited at the input terminals of LVDS receiver 205. Note that while the internal termination resistance 250 of LVDS output buffer 220 is coupled across pads 230–231, the LVDS transmitter within LVDS output buffer 220 is disabled while configurable LVDS system 200 is configured to operate as an LVDS receiver. As described in more detail below, this configuration of LVDS output buffer 220 is controlled by configuration data values, including but not limited to, LVDS[3:0], TSTATE# and LVDSIN_ON. These configuration data values are provided by configuration memory cells, which are illustrated as squares containing X's.

The control of configurable LVDS system 200 will now be described in more detail. This description assumes that the present invention is implemented by modifying the control of a Virtex-II™ FPGA. It is understood that the present invention can be implemented in other manners by those of ordinary skill in the art.

Figure 3:
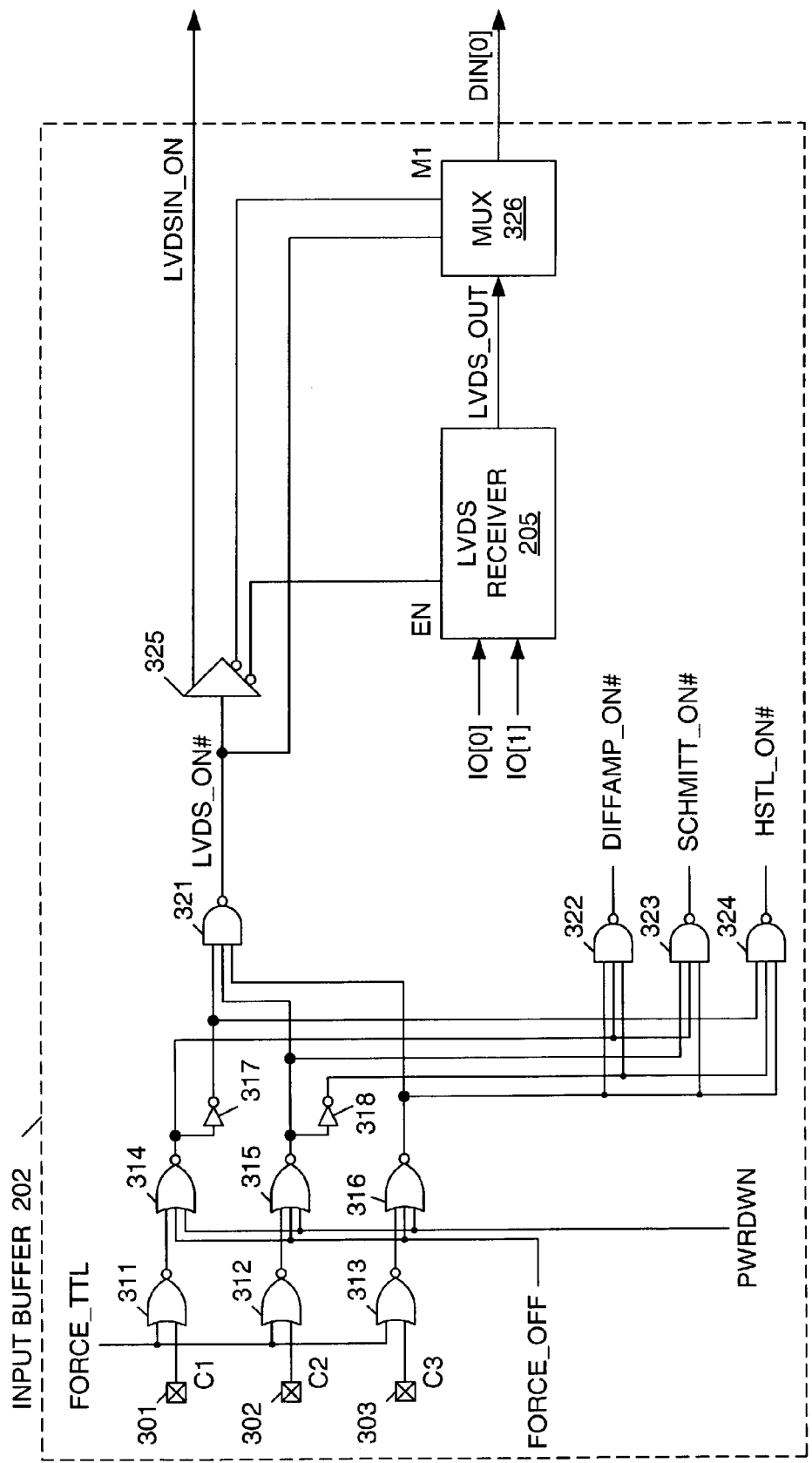
FIG. 3 is a circuit diagram of an input buffer of the configurable LVDS system of FIG. 2 in accordance with one embodiment of the present invention.

FIG. 3 is a circuit diagram illustrating input buffer 202 in accordance with one embodiment of the present invention. In addition to LVDS receiver 205, input buffer 202 includes configuration memory cells 301–303, NOR gates 311–316, inverters 317–318, NAND gates 321–324, buffer 325 and multiplexer 326. Input buffer 202 also includes various other receiver elements, including but not limited to, a differential amplifier, a Schmitt trigger and a high-speed transceiver logic (HSTL) receiver (not shown). As described in more detail below, these other receiver elements, which can be available in conventional IOBs, are not enabled in the present invention. Configuration memory cells 301–303 are loaded with configuration data values C1–C3, respectively, that are used to determine the configuration of input buffer 202. More specifically, configuration values C1–C3 determine which (if any) of the receiver elements is enabled.

NOR gates 311–316, inverters 317–318 and NAND gates 321–324 are configured to activate one (or none) of the enable signals LVDS_ON#, DIFFAMP_ON#, SCHMITT_ON# or HSTL_ON# in response to configuration data values C1–C1. Each of these enable signals is active low, as indicated by the "#" symbol at the end of each enable signal name. The LVDS_ON#, DIFFAMP_ON#, SCHMITT_ON# and HSTL_ON# enable signals are used to enable LVDS receiver 305, the differential amplifier, the Schmitt trigger and the HSTL receiver, respectively.

Table 1 summarizes the manner in which the various receiver elements are enabled in response to the configuration data values C1–C3.

TABLE 1

| C1 | C2 | C3 | ENABLED RECEIVER ELEMENT |
|----|----|----|--------------------------|
| 1  | 1  | 1  | Schmitt Trigger (SCHMITT_ON# = 0) |
| 1  | 0  | 1  | Differential Amplifier (DIFFAMP_ON# = 0) |
| 0  | 1  | 1  | LVDS Receiver (LVDS_ON# = 0) |
| 0  | 0  | 1  | HSTL Receiver (HSTL_ON# = 0) |
| X  | X  | 0  | All Off |

Thus, to activate LVDS receiver 205, the configuration memory cells 301–303 are loaded with configuration data values C1, C2 and C3 equal to "0", "1" and "1", respectively. The peripheral control signals FORCE_TTL, FORCE_OFF and PWRDWN all have logic "0" values during normal operation of input buffer 202. As a result, NAND gate 321 activates the LVDS_ON# signal low (and deactivates the DIFFAMP_ON#, SCHMITT_ON# and HSTL_ON# signals high) in response to configuration data values C1–C3.

The low LVDS_ON# signal causes buffer 325 to provide a logic high enable signal EN to LVDS receiver 205, thereby activating LVDS receiver 205. When enabled, LVDS receiver 205 provides a signal LVDS_OUT in response the differential input signal IO[1:0]. Buffer 325 also provides a logic high multiplexer select signal M1 to multiplexer 326 in response to the low LVDS_ON# signal. In response to the high multiplexer select signal M1 1 (and the low LVDS_ON# signal), multiplexer 326 routes the LVDS_OUT signal to the PLD as the DIN[0] signal. Although the connections are not shown in FIG. 3, multiplexer 326 also has the ability to route signals provided by the differential amplifier, Schmitt trigger and HSTL receiver in response to the DIFFAMP_ON#, SCHMITT_ON# and HSTL_ON# signals.

Buffer 325 also causes an LVDSIN_ON control signal to be driven to a logic "0" state in response to the logic low LVDS_ON# signal. The LVDSIN_ON signal is routed from input buffer 202 to LVDS output buffer 220. As described in more detail below, the logic "0" LVDSIN_ON signal causes the LVDS transmitter within LVDS output buffer 220 to be disabled. Thus, the logic "0" LVDS_ON# signal causes LVDS receiver 205 to be enabled, and causes the LVDS transmitter within LVDS output buffer 220 to be disabled.

Figure 4:
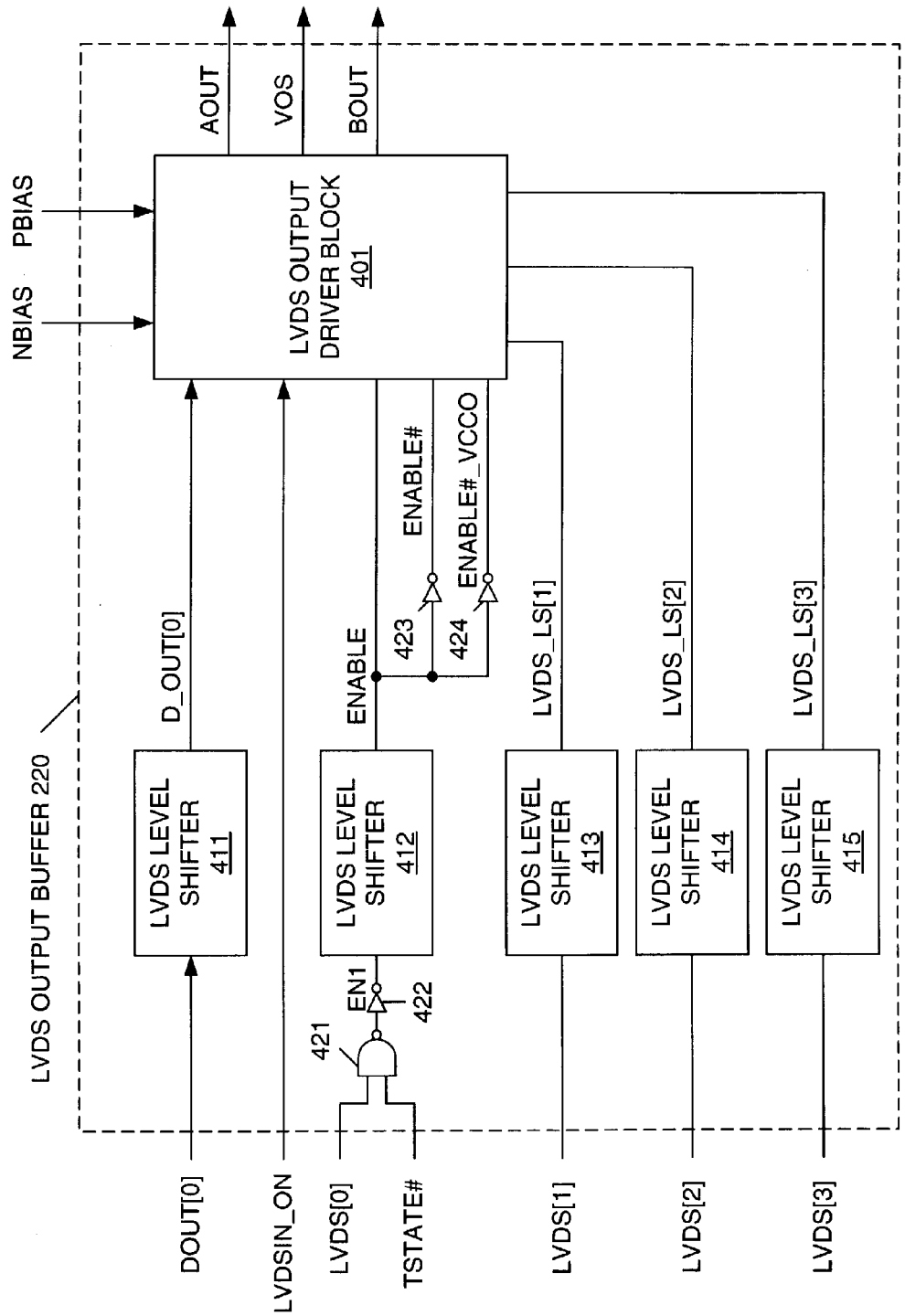
FIG. 4 is a block diagram of an LVDS output buffer of the configurable LVDS system of FIG. 2 in accordance with one embodiment of the present invention.

FIG. 4 is a block diagram of LVDS output buffer 220 in accordance with the present embodiment. LVDS output buffer 220 includes LVDS level shifters 411–415, which shift the voltages of the received signals to the appropriate levels. For example, LVDS level shifter 411 shifts the voltage of the output data value DOUT[0] to the appropriate level, thereby creating the output data value D_OUT[0]. Note that the output data value DOUT[0] is not used when configurable LVDS system 200 is configured as an LVDS receiver. LVDS output buffer 220 also includes LVDS output driver block 401, NAND gate 421 and inverters 422–424.

The LVDS[3:0] configuration data values and the tri-state enable (TSTATE#) configuration data value are provided to LVDS output buffer 220. As described in more detail below, the LVDS[3:0] configuration data values are selected to enable the internal termination resistance 250 located within LVDS output buffer 220. To accomplish this, the LVDS[0], LVDS[1], LVDS[2], LVDS[3] configuration data values are set to values equal to "1", "0", "0" and "0", respectively, and the TSTATE# configuration data value is a set to a logic "1" value.

The logic "1" LVDS[0] and TSTATE# configuration data values cause NAND gate 421 to provide a logic "0" output signal, such that inverter provides a logic "1" enable signal EN1 to LVDS level shifter 412. In response, LVDS level shifter provides a logic "1" ENABLE control signal to LVDS output driver block 401. Inverters 423 and 424, which are coupled to receive the logic "1" ENABLE control signal, provide logic "0" control signals, ENABLE# and ENABLE#_VCCO.

LVDS level shifters 413–415 provide the level-shifted LVDS_LS[1], LVDS_LS[2] and LVDS_LS[3] control signals, respectively, in response to the LVDS[1], LVDS[2] and LVDS[3] configuration data values, respectively. Thus, the LVDS_LS[1], LVDS_LS[2] and LVDS_LS[3] control signals have logic values of "0", "0" and "0", respectively.

LVDS output driver block 401 is also configured to receive the NBIAS and PBIAS signals, which are used to bias n-channel and p-channel transistors of the LVDS transmitter within LVDS output driver block 401.

Figure 5:
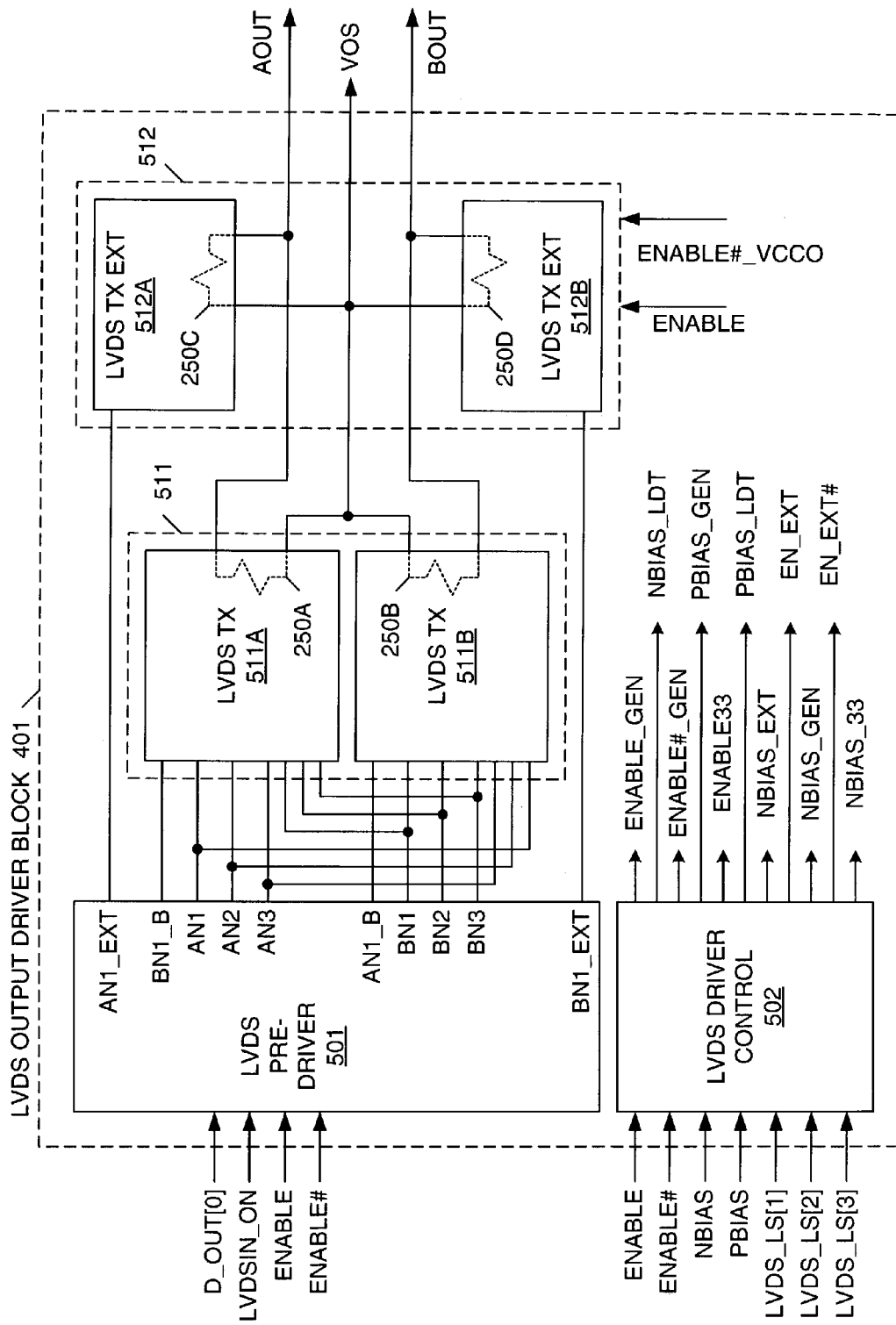
FIG. 5 is a block diagram of an LVDS driver block of the LVDS output buffer of FIG. 4 in accordance with one embodiment of the present invention.

FIG. 5 is a block diagram of LVDS output driver block 401 in accordance with the described embodiment. LVDS output driver block 401 includes LVDS pre-driver 501, LVDS driver control circuit 502, LVDS transmitter 511 and LVDS transmitter extension 512. LVDS transmitter 511 is divided into a pair of identical LVDS transmitter half-circuits 511A and 511B. Similarly, LVDS transmitter extension 512 is divided into a pair of identical LVDS transmitter extension half-circuits 512A and 512B.

In general, LVDS driver control 502 generates a plurality of control signals in response to the received control signals: ENABLE, ENABLE#, NBIAS, PBIAS, LVDS_LS[1], LVDS_LS[2] and LVDS_LS[3]. The control signals generated by LVDS driver control 502 (i.e., ENABLE_GEN, ENABLE#_GEN, ENABLE33, NBIAS_EXT, NBIAS_GEN, NBIAS_33, NBIAS_LDT, PBIAS_GEN, PBIAS_LDT, EN_EXT and EN_EXT#) are used to control LVDS transmitter 511 and LVDS transmitter extension 512. As described in more detail below, the ENABLE_GEN, ENABLE#_GEN and ENABLE33 are used to enable internal termination resistances 250A and 250B in LVDS transmitter 511.

The ENABLE and ENABLE#_VCCO control signals derived from the LVDS[0] and TSTATE# configuration data values (FIG. 4) are provided to LVDS transmitter extension 512. As described in more detail below, the ENABLE and ENABLE#_VCCO control signals are used to enable internal termination resistances 250C and 250D in LVDS transmitter extension 512.

Figure 6:
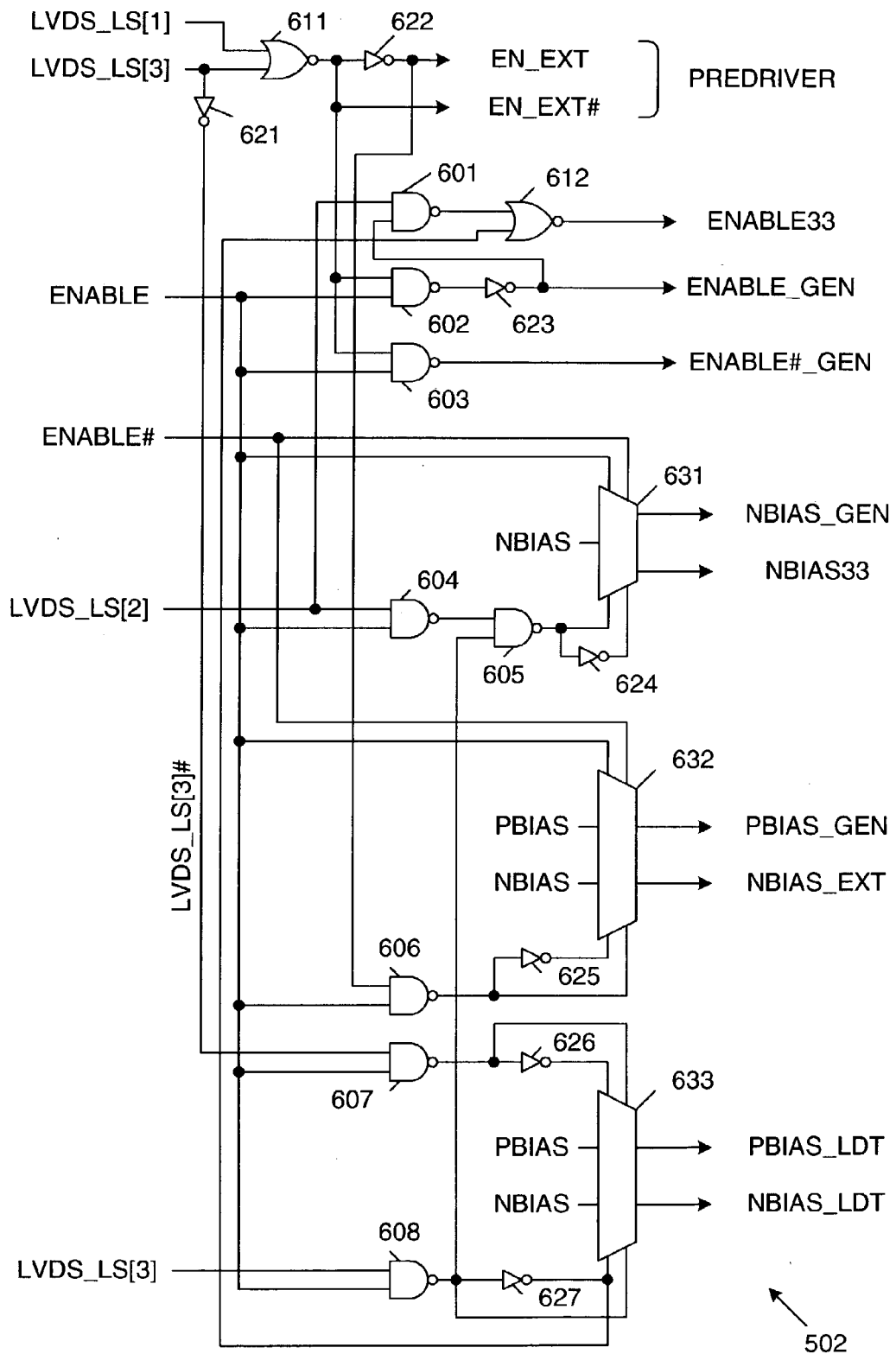
FIG. 6 is a circuit diagram of an LVDS driver control circuit of the LVDS driver block of FIG. 5 in accordance with one embodiment of the present invention.

FIG. 6 is a circuit diagram of LVDS driver control 502 in accordance with one embodiment of the present invention. LVDS driver control 502 includes NAND gates 601–608, NOR gates 611–612, inverters 621–627 and multiplexers 631–633, which are connected as illustrated.

NOR gate 611 and inverter 622 are configured to provide EN_EXT and EN_EXT# control signals in response to the LVDS_LS[1] and LVDS_LS[3] configuration data values. When LVDS_LS[1] and LVDS_LS[3] both have logic "0" values, the EN_EXT signal has a logic "0" value, and the EN_EXT# signal has a logic "1" value. As described in more detail below, these EN_EXT and EN_EXT# values are used by LVDS pre-driver circuit 501 to disable LVDS transmitter extension 512.

The logic "0" state of the EN_EXT# signal, along with the logic "1" state of the ENABLE control signal (FIG. 4), cause NAND gate 602 and inverter 623 to provide an ENABLE_GEN control signal having a logic "1" state, and further cause NAND gate 603 to provide a ENABLE#_GEN control signal having a logic "0" state.

The logic "0" state of the LVDS_LS[2] configuration data value and the logic "1" state of the ENABLE_GEN signal cause NAND gate 601 to provide a logic "1" signal to a first input terminal of NOR gate 612. A second input terminal of NOR gate 612 is coupled to receive a signal that is the logical AND (as determined by NAND gate 608 and inverter 627) of the logic "0" LVDS_LS[3] signal and the logic "1" ENABLE signal. The second input terminal of NOR gate 612 therefore receives a logic "0" value. When the input terminals of NOR gate 612 receive logic "0" and logic "1" values, NOR gate 612 provides an ENABLE33 control signal having a logic "0" value.

Multiplexers 631–633 are operated in response to control signals that are derived from the ENABLE, ENABLE#, LVDS_LS[0], LVDS_LS[3] and EN_EXT control signals in the manner illustrated. In response, multiplexers 631–633 selectively route the NBIAS voltage and/or the PBIAS voltage, or perform a pull-up function using a supply voltage, thereby providing the NBIAS_GEN, NBIAS33, PBIAS_GEN, NBIAS_EXT, PBIAS_LDT and NBIAS_LDT voltages. Although these voltages are selected in a manner that optimizes the disabling of LVDS transmitter 511 and LVDS transmitter extension 512, the exact manner in which these voltages are selected is not relevant to the present embodiment (because other signals provided by LVDS pre-driver 501 serve to disable LVDS transmitter 511 and LVDS transmitter extension 512).

Figure 7:
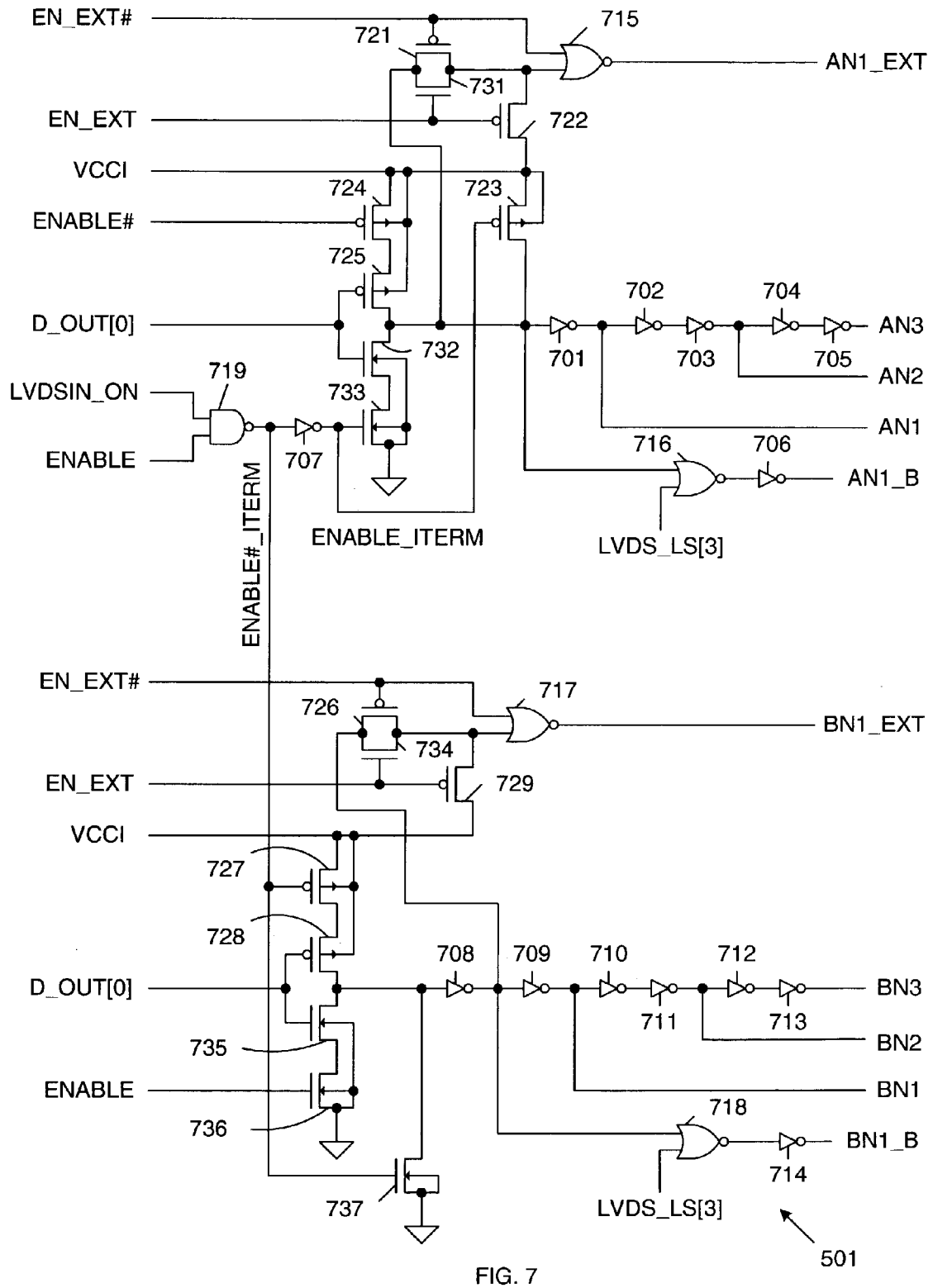
FIG. 7 is a circuit diagram of an LVDS pre-driver of the LVDS driver block of FIG. 5 in accordance with one embodiment of the present invention.

FIG. 7 is a circuit diagram of LVDS pre-driver 501 in accordance with one embodiment of the present invention. LVDS pre-driver 501 includes inverters 701–714, NOR gates 715–718, NAND gate 719, p-channel transistors 721–728 and n-channel transistors 731–737, which are connected as illustrated.

The logic "1" state of the EN_EXT# control signal and the logic "0" state of the EN_EXT control signal received from LVDS driver control 502 cause NOR gates 715 and 717 to provide AN1_EXT and BN1_EXT control signals having logic "0" states to LVDS transmitter extension 512. As described in more detail below, these logic "0" AN1_EXT and BN1_EXT control signals disable LVDS transmitter extension 512.

The logic "0" state of the LVDSIN_ON signal causes NAND gate 719 to provide an ENABLE#_ITERM control signal having a logic "1" state. The logic "1" state of the ENABLE#_ITERM signal turns on n-channel transistor 737. Turned-on transistor 737 pulls down the input terminal of inverter 708 to a logic "0" value. As a result, the inverter chain that includes series-connected inverters 708–713 provides logic "0" control signals BN1, BN2 and BN3. As described in more detail below, the logic "0" state of the BN1, BN2 and BN3 control signals help to disable LVDS transmitter 511.

Inverter 708 provides a logic "1" output signal to NOR gate 718, thereby causing NOR gate 718 to provide a logic "0" output signal to inverter 714. As a result, inverter 714 provides a logic "1" BN1_B control signal. As described in more detail below, this logic "1" BN1_B control signal helps to disable LVDS transmitter 511.

The logic "1" state of the ENABLE#_ITERM control signal also causes inverter 707 to provide a logic "0" ENABLE_ITERM control signal, which turns on p-channel transistor 723. Turned-on transistor 723 pulls up the input terminal of inverter 701 to a logic "1" value. As a result, the inverter chain that includes series-connected inverters 701–705 provides logic "0" control signals AN1, AN2 and AN3. As described in more detail below, these logic "0" AN1, AN2 and AN3 control signals help to disable LVDS transmitter 511.

Turned-on transistor 723 also pulls up an input terminal of NOR gate 716 to a logic "1" value, thereby causing NOR gate 716 to provide a logic "0" output signal to inverter 706. As a result, inverter 706 provides a logic "1" AN1_B control signal. As described in more detail below, this logic "1" AN1_B control signal helps to disable LVDS transmitter 511.

Figure 8:
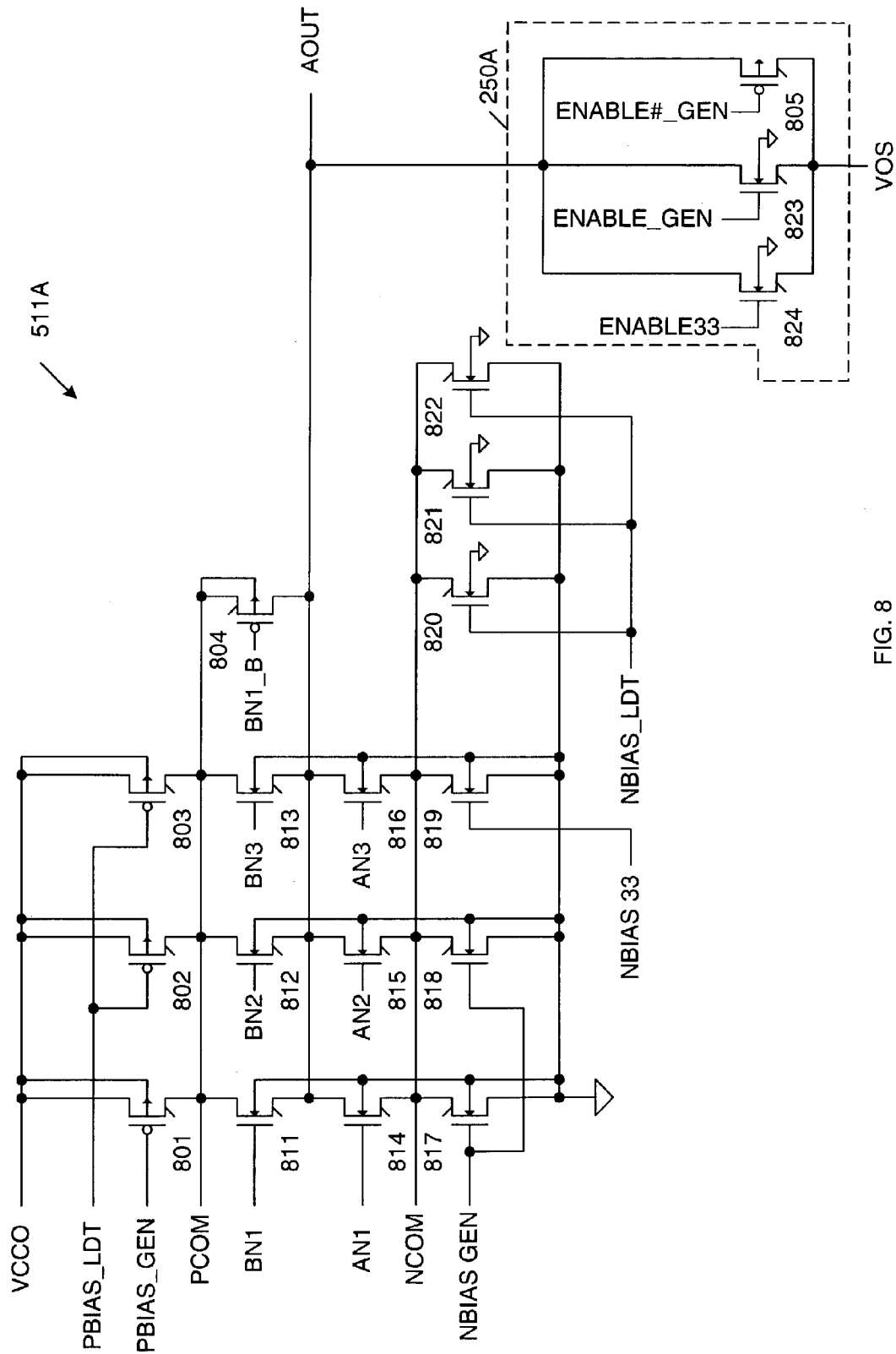
FIG. 8 is a circuit diagram of an LVDS transmitter half-circuit of the LVDS driver block of FIG. 5 in accordance with one embodiment of the present invention.

FIG. 8 is a circuit diagram of LVDS transmitter half-circuit 511A in accordance with the present embodiment. LVDS transmitter half-circuit 511A includes p-channel transistors 801–805 and n-channel transistors 811–824, which are connected as illustrated.

As described above, LVDS pre-driver circuit 501 generates control signals AN1, AN2, AN3, BN1, BN2 and BN3 having logic "0" values. As a result, n-channel transistors 811–816 are all turned off. LVDS pre-driver 501 also generates a control signal BN1_B having a logic "1" value, which turns off p-channel transistor 804. As a result, the output terminal AOUT is isolated from the PCOM and NCOM terminals in LVDS transmitter half-circuit 511A. Consequently, the output terminal AOUT is isolated from the VCCO and ground supply voltages. As a result, LVDS transmitter half-circuit 511A is disabled. That is, LVDS transmitter half-circuit 511A is prevented from driving an output signal onto the output terminal AOUT. Because the output terminal AOUT is isolated from the PCOM and NCOM terminals, the LVDS transmitter biasing voltages PBIAS_LDT, PBIAS_GEN, NBIAS_GEN, NBIAS33 and NBIAS_LDT are largely irrelevant in the described embodiment.

LVDS transmitter half-circuit 511B has a structure identical to the structure of LVDS transmitter half-circuit 511A. However, the equivalent to p-channel transistor 804 in LVDS transmitter half-circuit 511B is coupled to receive the logic "1" AN1_B control signal from LVDS pre-driver 501 (rather than the logic "1" BN1_B control signal). As a result, the output terminal BOUT in LVDS transmitter half-circuit 511B is isolated from the PCOM and NCOM terminals (i.e., LVDS transmitter half-circuit 511B is also disabled).

As described above in connection with FIG. 6, the ENABLE_GEN, ENABLE#_GEN and ENABLE33 control signals have values of "1", "0" and "0" in response to the LVDS[3:0] configuration data values. The logic "1" ENABLE_GEN control signal turns on n-channel transistor 823, while the logic "0" ENABLE#_GEN control signal turns on p-channel transistor 805. As a result, these transistors 805 and 823 provide a termination resistance 250A between the output terminal AOUT and the intermediate terminal VOS. Similar transistors in LVDS transmitter half-circuit 511B provide a termination resistance 250B between the output terminal BOUT and the intermediate terminal VOS. As a result, an internal termination resistance equal to the sum of termination resistances 250A and 250B is added between output terminals AOUT and BOUT.

Note that if the LVDS_LS[2] control signal has a logic "1" state, the ENABLE33 control signal will also be activated to a logic "1" state (via NAND gate 601 and NOR gate 612 of FIG. 7). As a result, transistor 824 will also be turned on, thereby adjusting the termination resistance for operation at a different voltage (i.e., 3.3 Volts).

Figure 9:
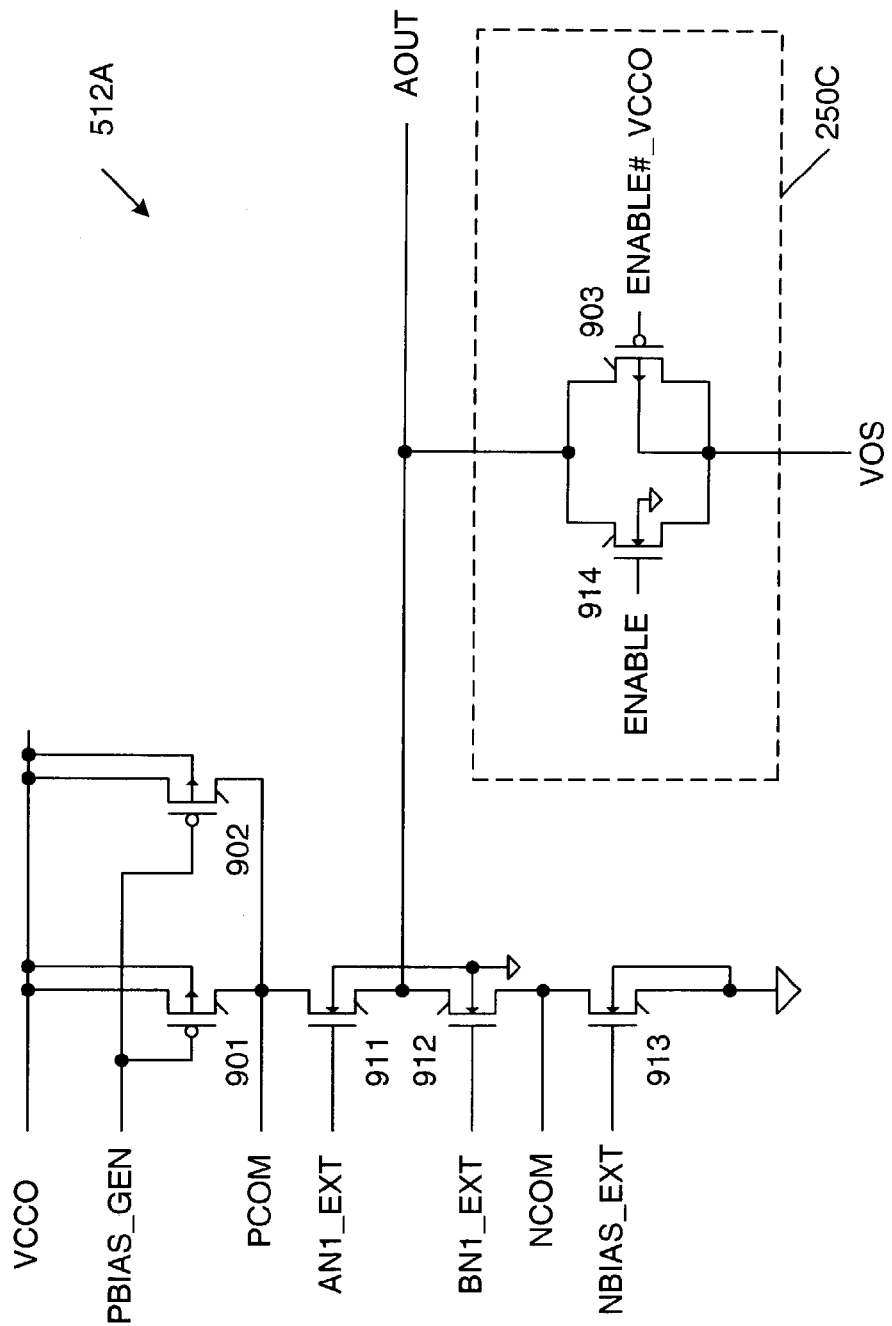
FIG. 9 is a circuit diagram of an LVDS transmitter extension half-circuit of the LVDS driver block of FIG. 5 in accordance with one embodiment of the present invention.

FIG. 9 is a circuit diagram of LVDS transmitter extension half-circuit 512A in accordance with the present embodiment. LVDS transmitter extension half-circuit 512A includes p-channel transistors 901–903 and n-channel transistors 911–914, which are connected as illustrated.

As described above, LVDS pre-driver circuit 501 generates control signals AN1_EXT and BN1_EXT having logic "0" values. As a result, n-channel transistors 911 and 912 are both turned off. As a result, the output terminal AOUT is isolated from the PCOM and NCOM terminals in LVDS transmitter extension half-circuit 512A. That is, the output terminal AOUT is isolated from the VCCO and ground voltage supply terminals, thereby disabling LVDS transmitter extension half-circuit 512A. Because the output terminal AOUT is isolated from the PCOM and NCOM terminals, the LVDS transmitter extension biasing voltages PBIAS_GEN and NBIAS_EXT are largely irrelevant in the described embodiment.

LVDS transmitter extension half-circuit 512B has a structure identical to the structure of LVDS transmitter extension half-circuit 512A. Thus, the output terminal BOUT in LVDS transmitter extension half-circuit 512B is isolated from the PCOM and NCOM terminals, thereby disabling LVDS transmitter extension half-circuit 512B.

As described above in connection with FIG. 4, the ENABLE and ENABLE#_VCCO control signals have values of "1" and "0", respectively, in response to the LVDS[0] and TSTATE# configuration data values. The logic "1" ENABLE control signal turns on n-channel transistor 914, while the logic "0" ENABLE#_VCCO control signal turns on p-channel transistor 903. As a result, these transistors 903 and 914 provide an addition termination resistance 250C between the output terminal AOUT and the intermediate terminal VOS. Similar transistors in LVDS transmitter extension half-circuit 512B provide a termination resistance 250D between the output terminal BOUT and the intermediate terminal VOS. As a result, an internal termination resistance equal to the sum of termination resistances 250C and 250D is added between output terminals AOUT and BOUT. Because these termination resistances 250C–250D are connected in parallel with termination resistances 250A–250B, the equivalent internal termination resistance 250 is reduced by the presence of termination resistances 250C–250D.

Note that if the LVDS_LS[1] or LVDS_LS[3] signal is modified to have a logic "1" state, then the ENABLE_GEN signal will have a logic "0" state and the ENABLE#_GEN signal will have a logic "1" state. (See, FIG. 6.) As a result, termination resistances 250A and 250B are effectively disabled, while termination resistances 250C and 250D remain enabled. In this manner the effective termination resistance can be modified.

In accordance with an alternate embodiment of the present invention, the LVDSIN_ON control signal provided by input buffer 202 is replaced by a configuration data value stored in a configuration memory cell, thereby simplifying the control and configuration of the configurable LVDS structure.

Figure 10:
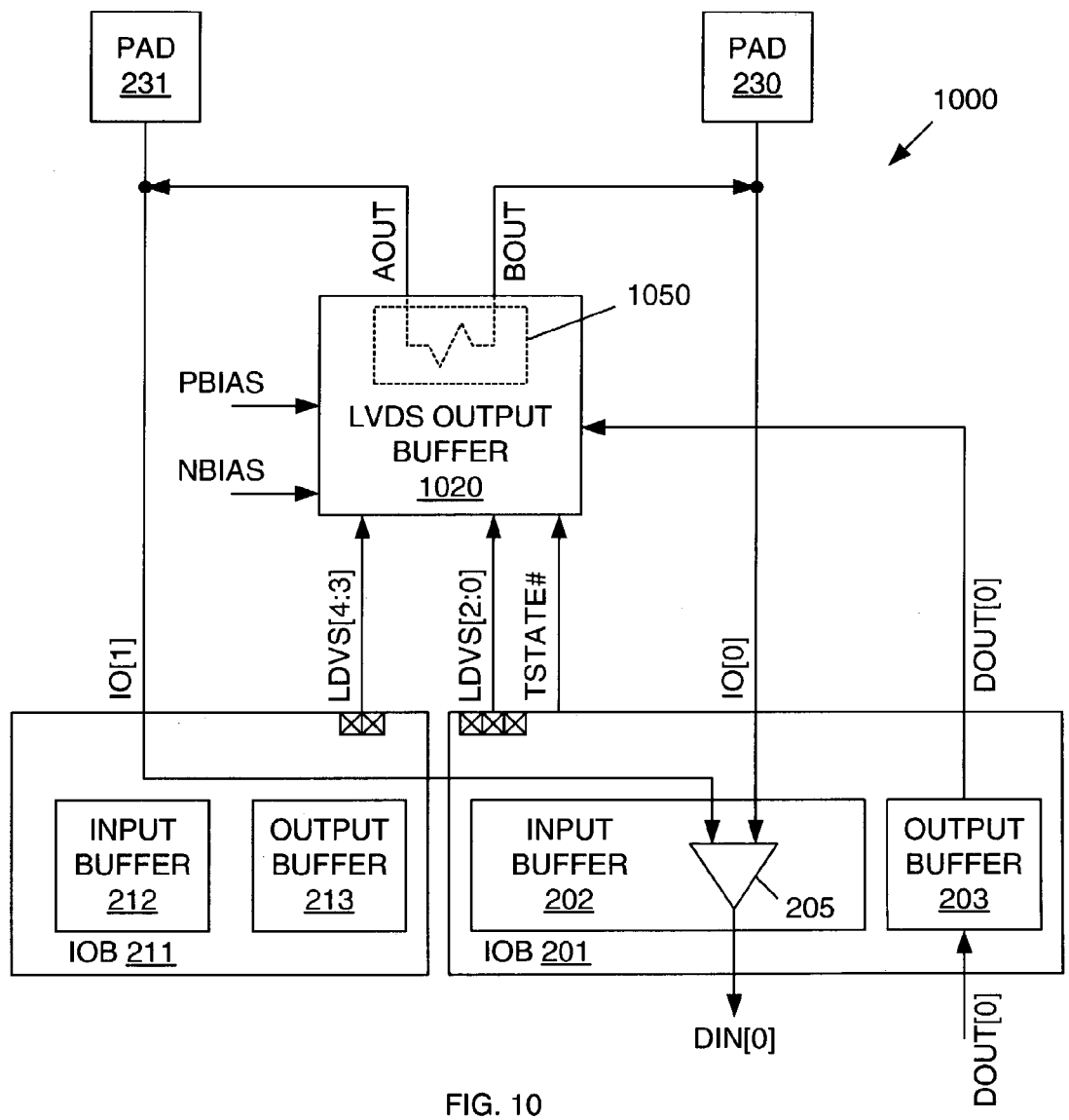
FIG. 10 is a block diagram of a configurable LVDS system in accordance with an alternative embodiment of the present invention.

FIG. 10 is a block diagram of a configurable LVDS system 1000 in accordance with this alternate embodiment of the present invention. Because configurable LVDS system 1000 (FIG. 10) is similar to configurable LVDS system 200 (FIG. 2), similar elements in FIGS. 2 and 10 are labeled with similar reference numbers. Thus, configurable LVDS system 1000 includes IOBs 201 and 211, input buffers 202 and 212, output buffers 203 and 213 and I/O pads 230–231. In addition, configurable LVDS system 1000 includes LVDS output buffer 1020. LVDS output buffer 1020 of configurable LVDS system 1000 shares many elements with LVDS output buffer 220 of configurable LVDS system 200, with the differences described in more detail below.

Notably, input buffer 202 does not provide the LVDSIN_ON signal to LVDS output buffer 1020 (i.e., the buffer 325 of input buffer 202 is modified such the LVDSIN_ON signal is no longer provided). An additional configuration memory cell in IOB 211 is dedicated to storing a configuration data value LVDS[4], which replaces the LVDSIN_ON signal. The configuration data value LVDS[4] is provided to LVDS output buffer 1020, as illustrated. As will become apparent in view of the following description, the LVDS[2] configuration data value is not used in the present embodiment.

As described in more detail below, the internal termination resistance 1050 of LVDS output buffer 1020 has a slightly different composition than the internal termination resistance 250 of LVDS output buffer 220 (FIG. 2).

Figure 11:
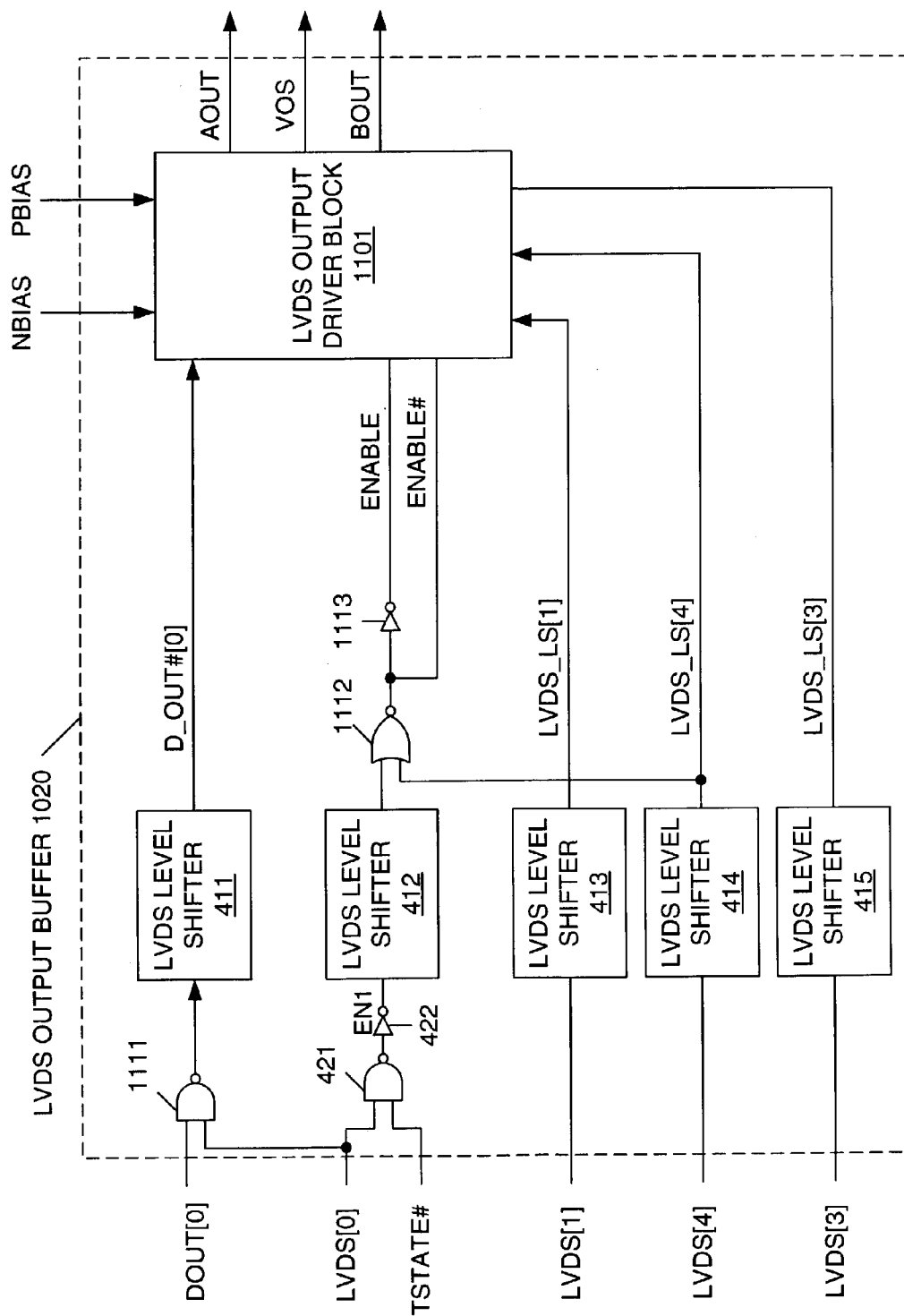
FIG. 11 is a block diagram of an LVDS output buffer of the configurable LVDS system of FIG. 10 in accordance with one embodiment of the present invention.

FIG. 11 is a block diagram of LVDS output buffer 1020 in accordance with the present embodiment of the invention. Because LVDS output buffer 1020 (FIG. 11) is similar to LVDS output buffer 220 (FIG. 3), similar elements in FIGS. 3 and 11 are labeled with similar reference numbers. Thus, LVDS output buffer 1020 includes LVDS level shifters 411–415, NAND gate 421 and inverter 422. LVDS output buffer 1020 also includes NAND gate 1111, NOR gate 1112, inverters 1113–1114 and LVDS output driver block 1101.

The configuration data values LVDS[4:3], LVDS[1:0] and TSTATE# are provided to LVDS output buffer 1020. Note that the TSTATE# signal can also be a user controlled signal in other embodiments. As described in more detail below, the configuration data values LVDS[4:3] and LVDS[1:0] are selected to enable the internal termination resistance 1050 located within LVDS output buffer 1020. To accomplish this, the LVDS[0], LVDS[1], LVDS[3], LVDS[4] configuration data values are set to values equal to "0", "0", "0" and "1", respectively. Note that when the input buffer 202 is selected, and the TSTATE# configuration data value (or user selected signal) is a set to a logic "0" value.

NAND gate 421 and inverter 422 provide an enable signal EN1 having a logic "0" state in response to the logic "0" states of the LVDS[0] and TSTATE# configuration data values. LVDS level shifter 414 provides a logic "1" control signal to NOR gate 1112 in response to the logic "1" LVDS[4] signal. As a result, NOR gate 1112 provides and ENABLE# control signal having a logic "0" state. Inverter 1113 provides an ENABLE control signal having a logic "1" state in response to the logic "0" ENABLE# control signal.

LVDS level-shifters 413, 414 and 415 provide level-shifted signals LVDS_LS[1], LVDS_LS[4] and LVDS_LS[3], respectively, in response to the LVDS[1], LVDS[4] and LVDS[3] configuration data values, respectively. LVDS level-shifter 411 provides a logic '1' level-shifted output data value D_OUT#[0] in response to the signal provided by NAND gate 411. Note that the output data value D_OUT#[0] is not used when configurable LVDS system 1000 is configured as an LVDS receiver, and LVDS[0] has a logic "0" state.

Figure 12:
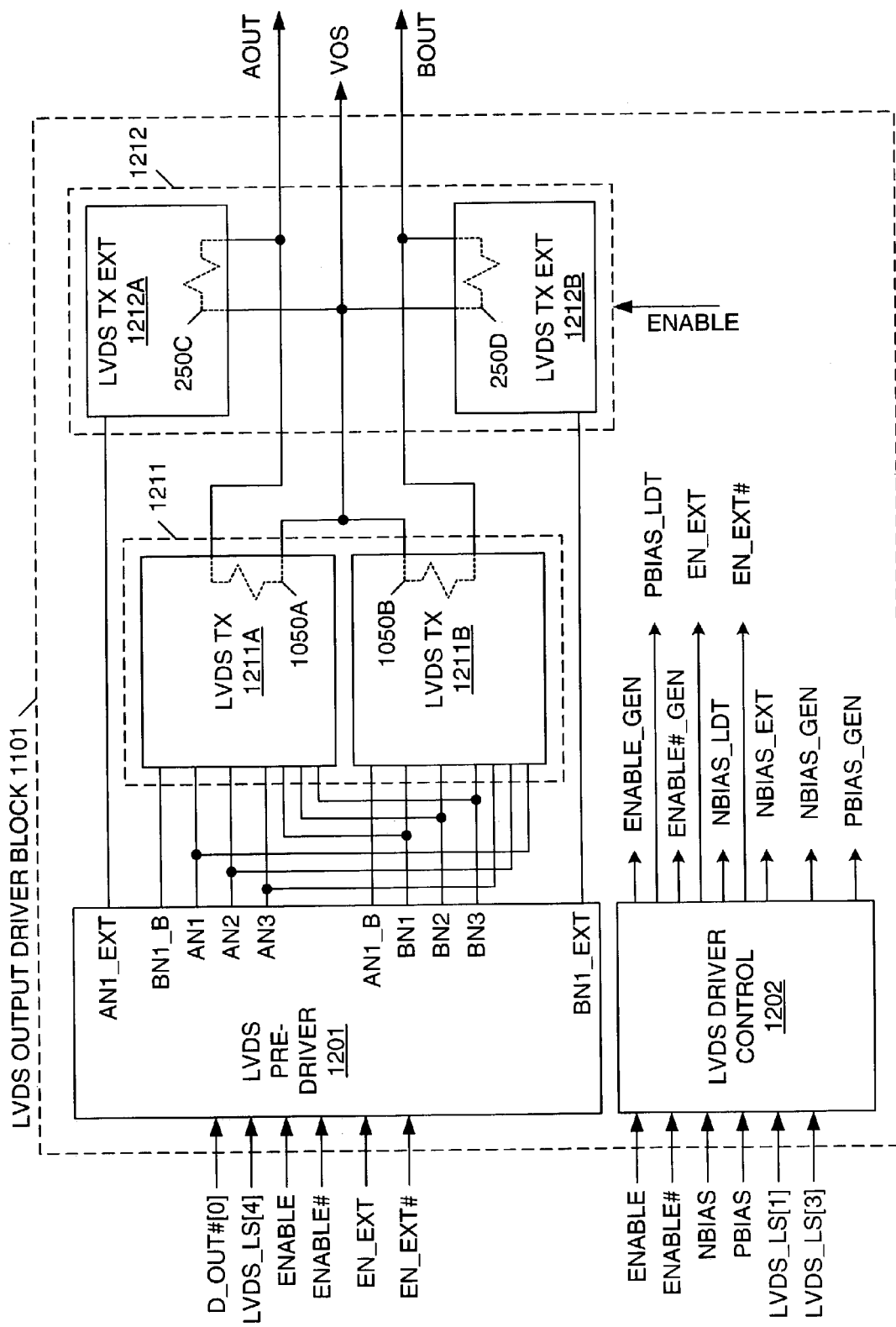
FIG. 12 is a block diagram of an LVDS driver block of the LVDS output buffer of FIG. 11 in accordance with one embodiment of the present invention.

FIG. 12 is a block diagram of LVDS output driver block 1101 in accordance with the described embodiment. LVDS output driver block 1101 includes LVDS pre-driver 1201, LVDS driver control circuit 1202, LVDS transmitter 1211 and LVDS transmitter extension 1212. LVDS transmitter 1211 is divided into a pair of identical LVDS transmitter half-circuits 1211A and 1211B. LVDS transmitter extension 1212 is divided into a pair of identical LVDS transmitter half-circuits 1212A and 1212B.

In general, LVDS driver control 1202 generates a plurality of control signals in response to the received control signals: ENABLE, ENABLE#, NBIAS, PBIAS, LVDS_LS[1] and LVDS_LS[3]. The control signals generated by LVDS driver control 1202 (i.e., ENABLE_GEN, ENABLE#-GEN, NBIAS_EXT, NBIAS_GEN, NBIAS_LDT, PBIAS_GEN, PBIAS_LDT, EN_EXT and EN_EXT#) are used to control LVDS transmitter 1211 and LVDS transmitter extension 1212. As described in more detail below, the ENABLE_GEN and ENABLE#_GEN signals are used to enable internal termination resistances 1050A and 1050B in LVDS transmitter 1211.

The ENABLE control signal derived from the LVDS[4] configuration data value (FIG. 11) is provided to LVDS transmitter extension 1212. As described above in connection with FIG. 9, the ENABLE control signal is used to enable internal termination resistances 250C and 250D in LVDS transmitter extension 1212.

Figure 13:
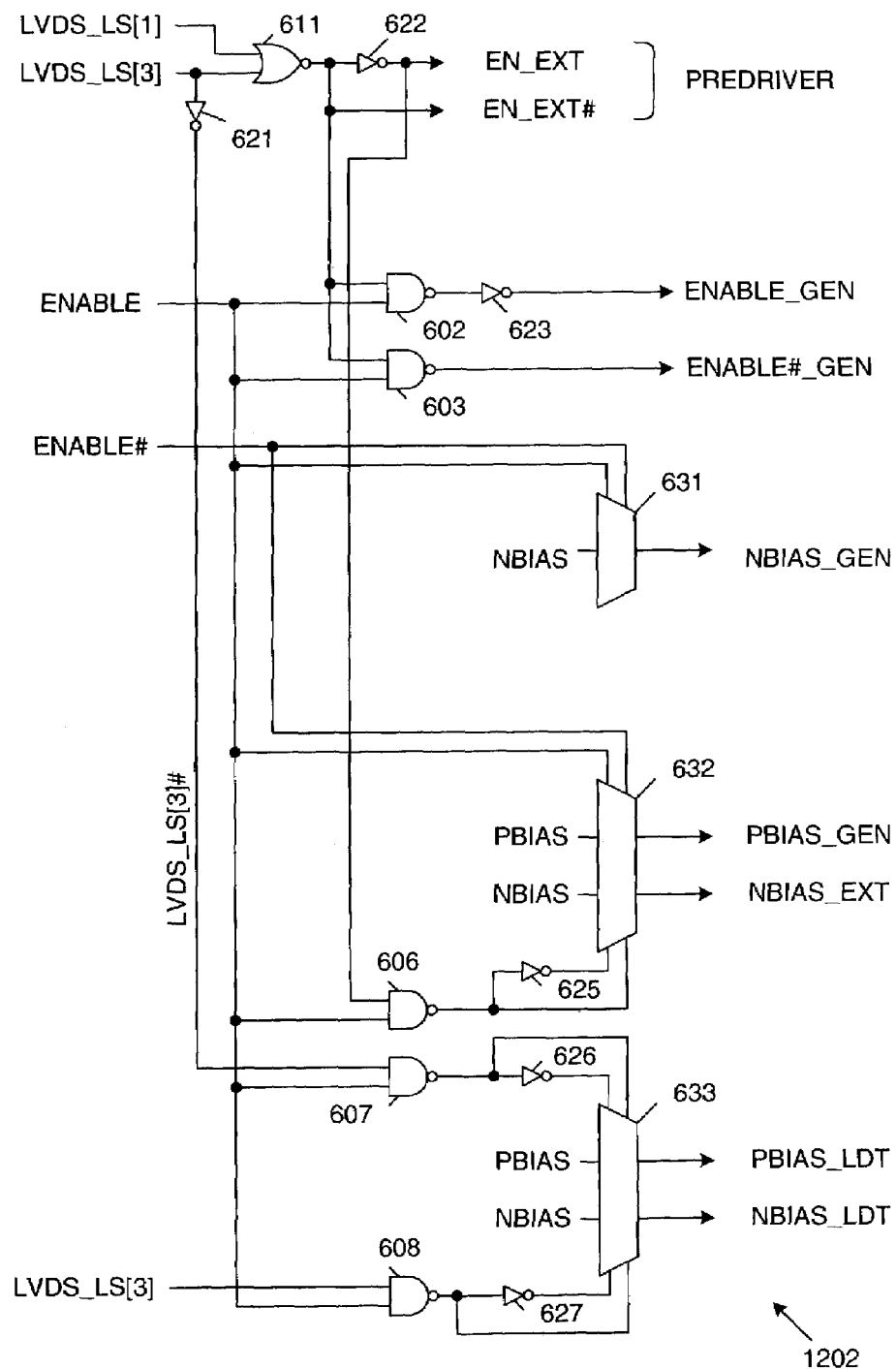
FIG. 13 is a circuit diagram of an LVDS driver control circuit of the LVDS driver block of FIG. 12 in accordance with one embodiment of the present invention.

FIG. 13 is a circuit diagram of LVDS driver control 1202 in accordance with one embodiment of the present invention. Because LVDS driver control 1202 (FIG. 13) is similar to LVDS driver control 502 (FIG. 6), similar elements in FIGS. 6 and 13 are labeled with similar reference numbers. Thus, LVDS driver control 1202 includes NAND gates 602–603 and 606–608, NOR gate 611, inverters 621–623 and 625–627 and multiplexers 631–633.

The EN_EXT and EN_EXT# control signals are generated in response to the LVDS_LS[1] and LVDS_LS[3] signals in the same manner described above in connection with FIG. 6. Thus, the EN_EXT signal has a logic "0" state and the EN_EXT# has a logic "1" state in response to the logic "0" states of the LVDS_LS[1] and LVDS_LS[3] signals.

The ENABLE_GEN and ENABLE#_GEN control signals are generated in response to the EN_EXT# and ENABLE control signals in the same manner described above in connection with FIG. 6. Thus, the ENABLE_GEN signal has a logic "1" state (and the ENABLE#_GEN signal has a logic "0" state) in response to the logic "1" state of the ENABLE signal and the logic "1" state of the EN_EXT# signal.

Multiplexers 631–633 are operated in response to control signals that are derived from the ENABLE, ENABLE#, LVDS_LS[3] and EN_EXT control signals in the manner illustrated. In response, multiplexers 631–633 selectively route the NBIAS voltage and/or the PBIAS voltage, or perform a pull-up function using a VCCO supply voltage, to provide the NBIAS_GEN, PBIAS_GEN, NBIAS_EXT, PBIAS_LDT and NBIAS_LDT voltages. Although these voltages are selected in a manner that optimizes the disabling of LVDS transmitter 1211 and LVDS transmitter extension 1212, the exact manner in which these voltages are selected is not relevant to the present embodiment (because other signals provided by LVDS pre-driver 1201 serve to disable LVDS transmitter 1211 and LVDS transmitter extension 1212).

Figure 14:
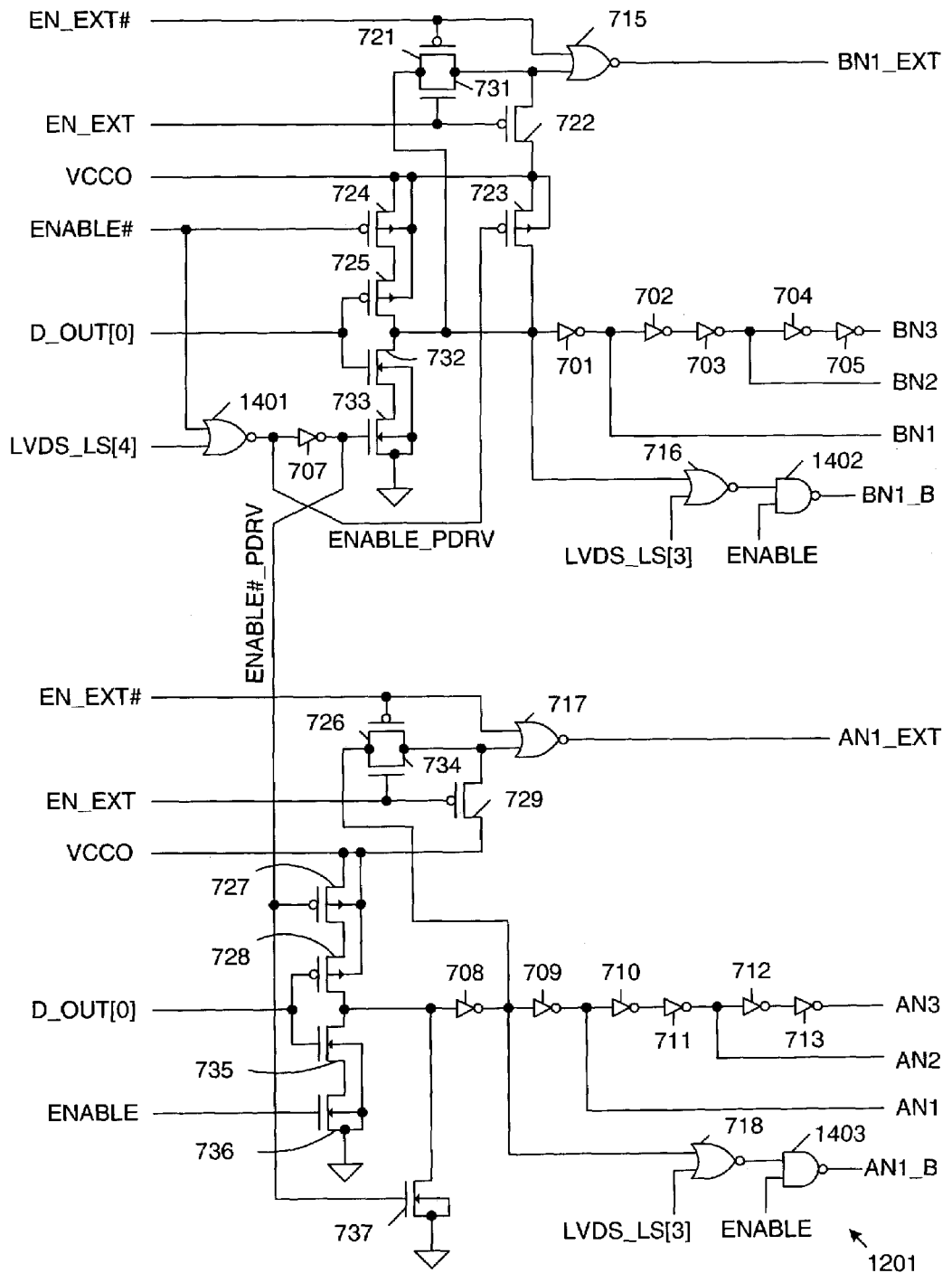
FIG. 14 is a circuit diagram of an LVDS pre-driver of the LVDS driver block of FIG. 12 in accordance with one embodiment of the present invention.

FIG. 14 is a circuit diagram of LVDS pre-driver circuit 1201 in accordance with the present embodiment. Because LVDS pre-driver 1201 (FIG. 14) is similar to LVDS pre-driver 501 (FIG. 7), similar elements in FIGS. 7 and 14 are labeled with similar reference numbers. Thus, LVDS pre-driver 1201 includes inverters 701–705 and 707–713, OR gates 715–718, p-channel transistors 721–728 and n-channel transistors 731–737. In addition, LVDS pre-driver circuit 1201 includes NOR gate 1401 and NAND gates 1402 and 1403, which are connected as illustrated.

In the manner described above in connection with FIG. 7, the AN1_EXT and BN1_EXT control signals are both forced to logic "0" states in response to the logic "1" state of the EN_EXT# signal and the logic "0" state of the EN_EXT signal.

LVDS pre-driver circuit 1201 includes NOR gate 1401, which provides a logic "0" ENABLE_PDRV control signal in response to the logic "1" state of the LVDS_LS[4] signal. Inverter 707 provides a logic "1" ENABLE#_PDRV control signal in response to the logic "0" state of the ENABLE_PDRV control signal. The logic "1" ENABLE#_PRDV signal causes each of the AN1, AN2 and AN3 signals to be driven to a logic "0" state (in the same manner that the logic "1" ENABLE#_ITERM signal causes each of the BN1, BN2 and BN3 signals to be driven to a logic "0" state in FIG. 7).

The logic "1" ENABLE#_PDRV signal causes a logic "1" voltage to be provided to an input terminal of NOR gate 718. As a result, NOR gate 718 provides a logic "0" signal to NAND gate 1403, thereby causing NAND gate 1403 to provide a AN1_B signal having a logic "1" state.

The logic "0" ENABLE_PDRV signal causes each of the BN1, BN2 and BN3 signals to be driven to a logic "0" state (in the same manner that the logic "0" ENABLE_ITERM signal causes each of the AN1, AN2 and AN3 signals to be driven to a logic "0" state in FIG. 7).

The logic "0" ENABLE_PDRV signal causes a logic "1" voltage to be provided to an input terminal of NOR gate 716. As a result, NOR gate 716 provides a logic "0" signal to NAND gate 1402, thereby causing NAND gate 1402 to provide an BN1_B signal having a logic "1" state.

As described in more detail below, the logic "0" states of the AN1, AN2, AN3, BN1, BN2 and BN3 signals, and the logic "1" states of the AN1_B and BN1_B signals disable LVDS transmitter 1211. Thus, the logic "0" state of configuration data value LVDS[4] is ultimately responsible for disabling LVDS transmitter 1211.

Figure 15:
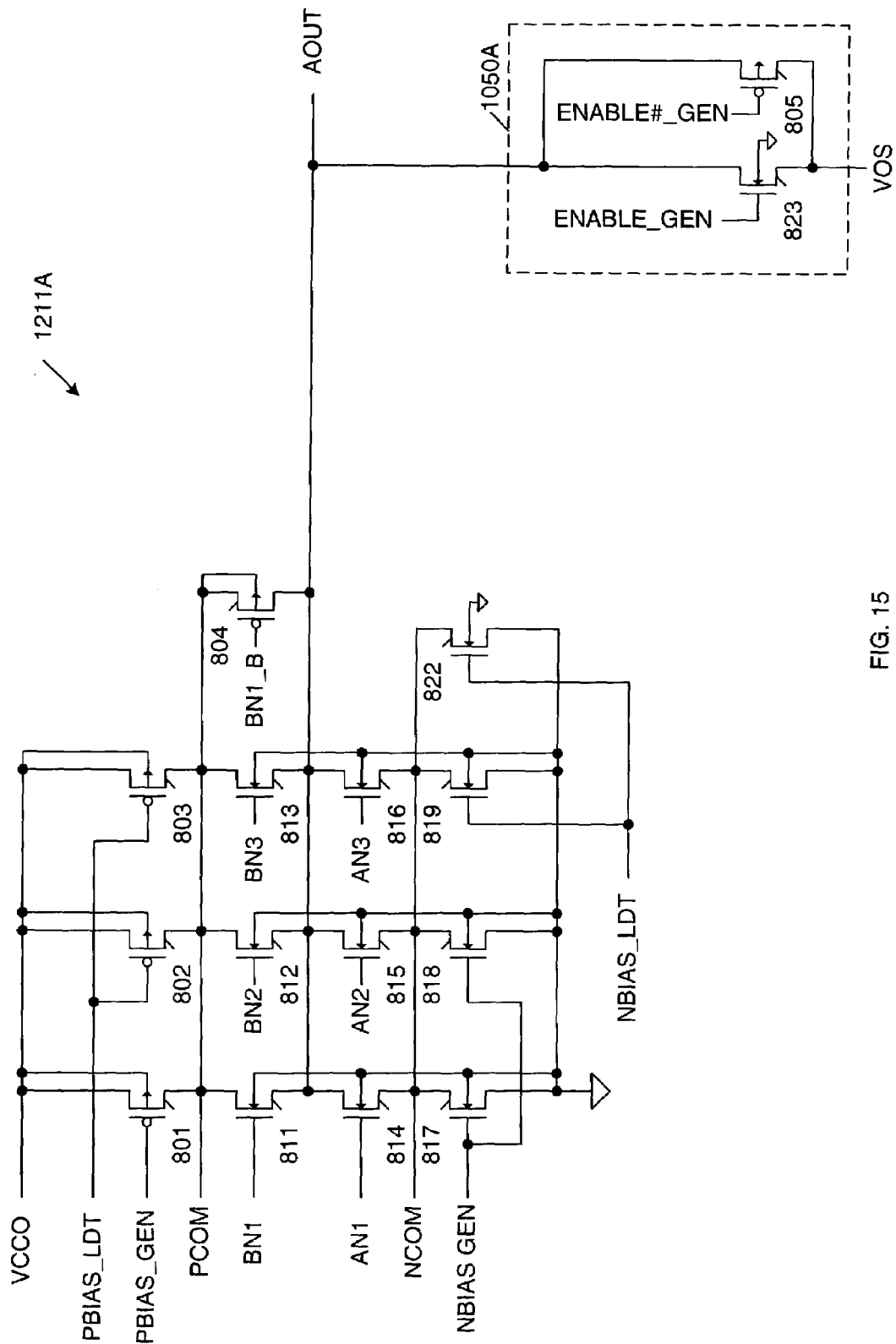
FIG. 15 is a circuit diagram of an LVDS transmitter half-circuit of the LVDS driver block of FIG. 12 in accordance with one embodiment of the present invention.

FIG. 15 is a circuit diagram of LVDS transmitter half-circuit 1211A in accordance with the present embodiment.

Because LVDS transmitter half-circuit 1211A (FIG. 15) is similar to LVDS transmitter half-circuit 511A (FIG. 8), similar elements in FIGS. 8 and 15 are labeled with similar reference numbers. Thus, LVDS transmitter half-circuit 1211A includes p-channel transistors 801–805 and n-channel transistors 811–819 and 822–823. Note that n-channel transistor 819 is controlled by the NBIAS_LDT signal (rather than the NBIAS33 signal) in FIG. 15. The logic "0" states of the AN1, AN2, AN3, BN1, BN2, BN3 signals, and the logic "1" state of the BN1_B signal turn off transistors 811–816 and 804, thereby disabling LVDS transmitter half-circuit 1211A in the same manner described above in connection with FIG. 8.

Similarly, the logic "1" state of the ENABLE_GEN signal and the logic "0" state of the ENABLE#_GEN signal turn on transistors 823 and 805, respectively, thereby enabling the internal termination resistance 1050A. LVDS transmitter half-circuit 1211B is substantially identical to LVDS transmitter half-circuit 1211A, and is controlled in the same manner to enable internal termination resistance 1050B.

Figure 16:
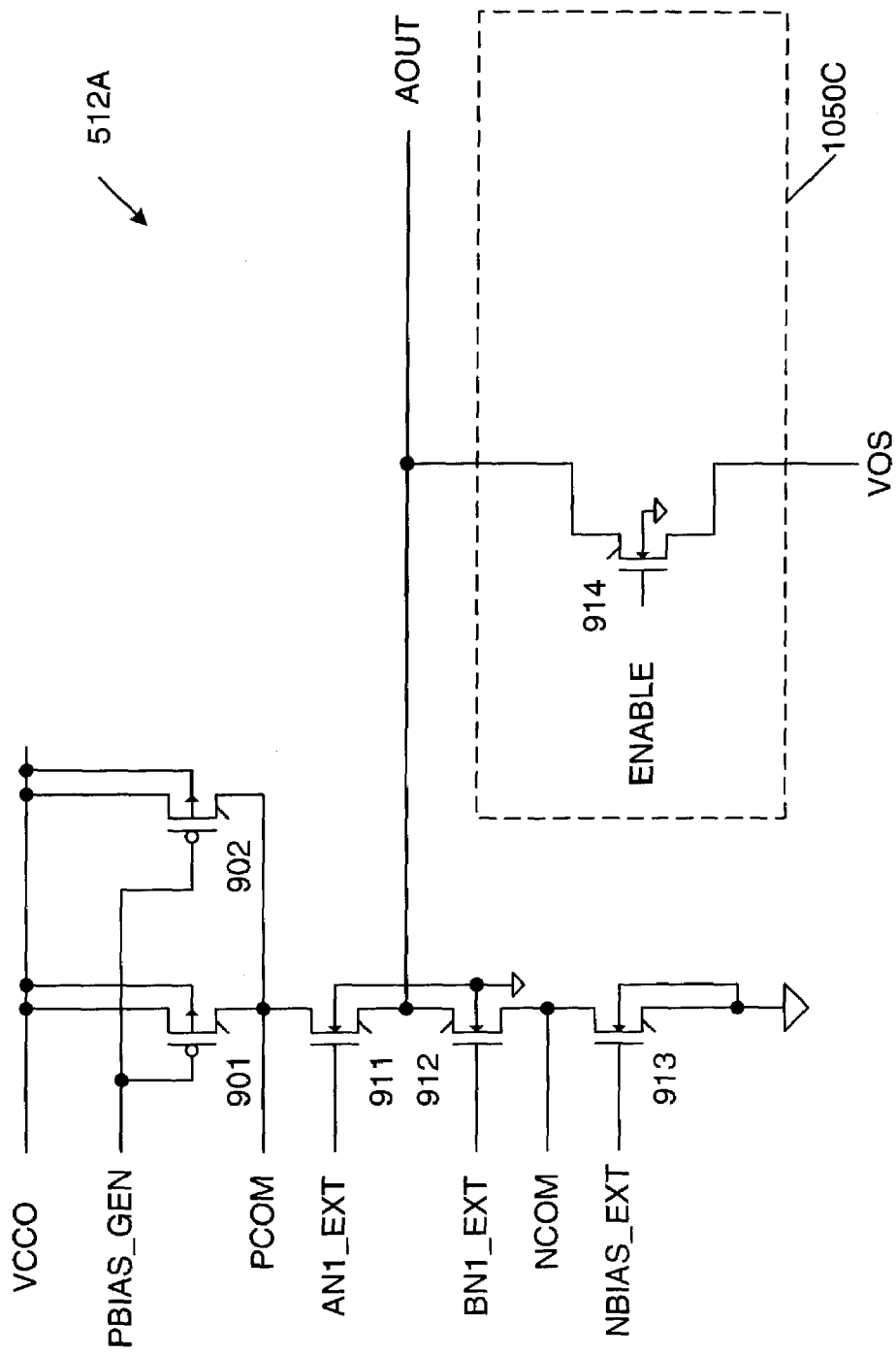
FIG. 16 is a circuit diagram of an LVDS transmitter extension half-circuit of the LVDS driver block of FIG. 12 in accordance with one embodiment of the present invention.

FIG. 16 is a circuit diagram of LVDS transmitter extension half-circuit 1212A in accordance with an embodiment of the present invention. Because LVDS transmitter extension half-circuit 1212A (FIG. 16) is similar to LVDS transmitter extension half-circuit 512A (FIG. 9), similar elements in FIGS. 9 and 16 are labeled with similar reference numbers. Thus, LVDS transmitter extension half-circuit 1212A includes p-channel transistors 901–902 and n-channel transistors 911–914. LVDS transmit extension half-circuits 1212A and 1212B operate in substantially the same manner described above in connection with FIG. 9, such that the LVDS transmit extension half-circuit 512A and 512B are disabled by the logic "0" states of the AN1_EXT and BN1_EXT signals, and the internal termination resistances 250C and 250D are enabled in response to the logic "1" state of the ENABLE signal.

Although the invention has been described in connection with several embodiments, it is understood that this invention is not limited to the embodiments disclosed, but is capable of various modifications, which would be apparent to one of ordinary skill in the art. Thus, the internal termination resistance of an LVDS transmitter can be configured for use as an internal termination resistance of an LVDS receiver in a variety of integrated circuit devices, including, but not limited to, field programmable gate arrays. Thus, the invention is limited only by the following claims.

We claim:

1. A configurable low voltage differential signal (LVDS) system located on a chip, the configurable LVDS system comprising:
    a pair of conductive terminals;
    an LVDS transmitter for driving a differential output signal to the pair of terminals;
    an LVDS receiver for receiving a differential input signal from the pair of terminals;
    a termination resistor selectively coupled across the pair of terminals, wherein the termination resistor is selected via a control signal for use with either the LVDS transmitter or the LVDS receiver; and
    a control circuit configured to selectively enable and disable the LVDS transmitter, the LVDS receiver and the termination resistor, wherein the control circuit is further configured to enable and disable one or more non-LVDS receivers, and in response to the control circuit enabling one of the one or more non-LVDS receivers, disabling the LVDS receiver and the LVDS transmitter.

2. The configurable LVDS system of claim 1, wherein the pair of conductive terminals comprise input/output pads located on the chip.

3. The configurable LVDS system of claim 1, wherein the termination resistor comprises one or more transistors coupled between the pair of terminals.

4. The configurable LVDS system of claim 1, wherein the control circuit is configured to select the termination resistor by activating the one or more transistors with the control signal, and to deselect the termination resistor by deactivating the one or more transistors with the control signal.

5. The configurable LVDS system of claim 1, wherein the control circuit is configured to enable the termination resistor and either the LVDS transmitter or the LVDS receiver.

6. The configurable LVDS system of claim 1, wherein the control circuit comprises one or more configuration memory cells, wherein the configuration memory cells store configuration data values that are used to enable and disable the LVDS transmitter, the LVDS receiver, the termination resistor, and the one or more non-LVDS receivers.

7. The configurable LVDS system of claim 1, wherein the LVDS transmitter comprises a first set of transistors configured to drive a first signal to a first one of the terminals, and a second set of transistors configured to drive a second signal, complementary to the first signal, to a second one of the terminals, wherein the control circuit disables the LVDS transmitter by turning off the first and second sets of transistors.

8. The configurable LVDS system of claim 1, further comprising:
    an LVDS transmitter extension connected in parallel with the LVDS transmitter across the pair of terminals; and
    a second termination resistance associated with the LVDS transmitter extension, and coupled across the pair of terminals.

9. A method of implementing a configurable low-voltage differential signal (LVDS) system on a chip, the method comprising:
    selectively coupling an LVDS transmitter,
    an LVDS receiver, and
    a termination resistor to a pair of input/output (I/O) pads on the chip; and
    selectively decoupling the LVDS transmitter, the LVDS receiver, and the termination resistor in response to coupling a non-LVDS receiver to the pair of I/O pads on the chip.

10. The method of claim 9, further comprising:
    loading one or more configuration data values into one or more corresponding configuration memory cells on the chip; and
    controlling the I/O pad coupling in response to the configuration data values.

11. The method of claim 9, wherein the step of selectively coupling the termination resistor comprises turning on one or more transistors coupled across the pair of I/O pads.

12. The method of claim 11, wherein the step of selectively decoupling the termination resistor further comprises turning off the one or more transistors coupled across the pair of I/O pads.

13. A configurable low voltage differential signal (LVDS) system located on a chip, the configurable LVDS system comprising:
    a pair of electrically conductive input/output (I/O) pads;
    an LVDS transmitter coupled to the pair of I/O pads;

a termination resistor coupled to the pair of I/O pads;

an LVDS receiver coupled to the pair of I/O pads;

means for selectively enabling and disabling the LVDS transmitter, the LVDS receiver and the termination resistor; and at least one non-LVDS receiver coupled to the pair of I/O pads, wherein the at least one non-LVDS receiver is enabled in response to disabling the LVDS transmitter, the LVDS receiver and the termination resistor.

14. The configurable LVDS system of claim 13, wherein the means for selectively enabling and disabling comprise a plurality of configuration memory cells that store a corresponding plurality of configuration data values.

15. The configurable LVDS system of claim 13, wherein the termination resistor comprises one or more transistors coupled across the I/O pads.

16. A configurable low voltage differential signal (LVDS) system located on a chip, the configurable LVDS system comprising:

a pair of conductive terminals;

an LVDS transmitter for driving a differential output signal to the pair of terminals;

an LVDS receiver for receiving a differential input signal from the pair of terminals; and a termination resistor selectively coupled across the pair of terminals, wherein the termination resistor includes, a first transistor network selectively coupled via a first control signal; and a second transistor network selectively coupled in parallel to the first transistor network via a second control signal.

17. The configurable LVDS system of claim 16, wherein the first transistor network comprises:

a first pair of series connected transistors coupled across the pair of terminals; and a second pair of series connected transistors coupled in parallel to the first pair of series connected transistors.

* * * * *